United States Patent
Handa et al.

[11] Patent Number: 5,829,833
[45] Date of Patent: *Nov. 3, 1998

[54] VEHICLE REAR SEAT PROVIDED WITH CHILD SEAT

[75] Inventors: Masami Handa, Ashikaga; Norikatsu Aoshima; Masataka Tobita, both of Gunma-Ken, all of Japan

[73] Assignees: Fuji Jukogyo Kabushiki Kaisha, Tokyo; NHK Spring Co., Ltd., Kanagawa, both of Japan

[*] Notice: The term of this patent shall not extend beyond the expiration date of Pat. No. 5,704,685.

[21] Appl. No.: 934,847

[22] Filed: Sep. 22, 1997

Related U.S. Application Data

[63] Continuation of Ser. No. 577,631, Dec. 22, 1995, Pat. No. 5,704,685.

[30] Foreign Application Priority Data

Dec. 27, 1994 [JP] Japan ................................. 6-337941
Dec. 27, 1994 [JP] Japan ................................. 6-337942

[51] Int. Cl.⁶ .................................................. A47C 15/00
[52] U.S. Cl. ............... 297/238; 297/378.13; 297/452.34; 297/452.35
[58] Field of Search ............................. 297/238, 378.13, 297/391, 410, 452.34, 452.35

[56] References Cited

U.S. PATENT DOCUMENTS

| | | | |
|---|---|---|---|
| 4,475,763 | 10/1984 | Hamatani et al. | 297/378.13 X |
| 4,572,569 | 2/1986 | Hassmann | 297/378.13 X |
| 4,657,297 | 4/1987 | Ishibashi | 297/378.13 X |
| 4,684,175 | 8/1987 | Trutter | 297/378.13 |
| 4,943,112 | 7/1990 | Law | 297/238 |
| 5,106,158 | 4/1992 | Dukatz et al. | 297/238 X |
| 5,224,756 | 7/1993 | Dukatz et al. | 297/238 |
| 5,282,668 | 2/1994 | Heussner et al. | 297/238 |
| 5,332,284 | 7/1994 | Elton et al. | 297/238 |
| 5,364,169 | 11/1994 | Collins et al. | |
| 5,380,060 | 1/1995 | Sponsler et al. | |
| 5,383,707 | 1/1995 | Osenkowski et al. | 297/238 |
| 5,601,334 | 2/1997 | Marks | 297/238 |
| 5,603,550 | 2/1997 | Holdamp et al. | 297/238 |
| 5,611,603 | 3/1997 | Gray et al. | 297/238 X |
| 5,647,634 | 7/1997 | Presser et al. | 297/238 |
| 5,653,504 | 8/1997 | Henson | 297/238 |
| 5,704,684 | 1/1998 | Dukatz et al. | 297/238 |
| 5,704,685 | 1/1998 | Handa et al. | 297/238 |
| 5,716,097 | 2/1998 | Peck | 297/238 |

*Primary Examiner*—Peter M. Cuomo
*Assistant Examiner*—Rodney B. White
*Attorney, Agent, or Firm*—Beveridge, DeGrandi, Weilacher & Young, LLP

[57] ABSTRACT

To form a child seat having relatively wide regulated side walls in a relatively thin folding seat back for a wagon or light van, without changing the hip point of the rear seat passenger, the rear seat is divided into a first wide seat back and a second narrow seat back in such a way as to be folded up frontward separately, a recessed seat back portion of the child seat is formed at roughly a vehicle-middle portion of the first wide seat back, a child seat cushion of the child seat is pivotally mounted at the child seat recessed seat back of the first wide seat back, and in particular, two side wall portions of the child seat are formed by a first projecting portion of the first wide seat back along an inner stepped portion of the recessed seat back portion and by a second projecting portion the second narrow seat back along an inner end surface of the second narrow seat back, respectively, in such a way that the child seat cushion can be accommodated in the recessed seat back portion when not used.

4 Claims, 4 Drawing Sheets

VEHICLE REAR SEAT PROVIDED WITH CHILD SEAT

This is a continuation of application Ser. No. 08/577,631 filed on Dec. 22, 1995 now U.S. Pat. No. 5,704,685.

BACKGROUND OF THE INVENTION

1. Field of the Invention

The present invention relates to a rear seat provided with a child seat for a vehicle such as a wagon or light van, in which a relatively thin folding rear seat is provided.

2. Description of the Related Art Information

Conventionally, when a little child rides in a car, the seat belt for an adult is often difficult to use or cannot be used at all. As a result, a separate child safety seat for use in automobiles is now marketed and has been used for some time. When used, the child seat is usually mounted on the front passenger seat or the rear seat of the vehicle and further fixed to the seat by use of a seat belt for the grown-up person.

In the child seat as described above, since the child seat is relatively heavy, there exists a problem in that it is troublesome to set, secure and remove the heavy child seat to and from the vehicle seat.

To overcome this problem, various child seats have been developed. For instance, Japanese Utility Model Application Laid-Open Publication (Kokai) No. 58-179231 discloses a child seat assembled together with a seat back of the rear seat in such a way as to be accommodated in a recessed seat back portion of the seat back, when not used, but capable of being pivoted frontward so that the child seat cushion projects from the lower portion of the seat back of the rear seat, when ready for use.

Various dimensional and safety regulations are set for the child seat, for by each nation, in order to secure safety for the child. In these regulations, there exists a requirement that the side wall area of the child seat must be wider than a predetermined value. In other words, it is regulated that the dimension of the child seat must exceed a predetermined value by the side wall area requirement.

In the rear seat back of the ordinary sedan-type vehicle, the thickness of the rear seat back is usually thick enough to accommodate the child seat in such a way as to satisfy the side wall area requirement. Further, when the thickness of the rear seat back is insufficient, it is easy to increase the thickness in the rearward direction thereof, that is, in a direction of the trunk room.

In the case of vehicles such as wagons or light vans in which the rear seat is folded down to increase the luggage room behind the rear seat, and, since the thickness of the rear seat back is restricted to be relatively thin from both the standpoint of convenience (when folded down for increasing the luggage room) and riding comformatability (when in the up position for rear passengers). Hence, the thickness of the rear seat back is not sufficient to accommodate the child seat. Also, in vehicles such as wagons and light vans with no rear bulkhead, i.e., a partition wall provided between the passenger room and the trunk room, the rear seat back is supported by the vehicle body by use of metal plate fixed to the rear surface of the rear seat back, so that it is impossible to increase the thickness of the rear seat back in the rearward direction. On the other hand, when the thickness of the rear seat back is increased in the frontward direction, the hip point of the rear seat passenger is shifted in the frontward direction, the space near the knees of the rear seat passenger is narrowed, with the result that the riding comfort deteriorates. In addition, the hip point of the rear seat passenger is a basic position when a seat belt mounting area is decided or when a dummy doll for a shock test is located. If this basic position is shifted, various tests must be performed again resulting in an increase in costs and man-hours. So far, it has been difficult to assemble the child seat with the rear seat back of vehicles such as wagons or light vans having a relatively thin folding rear seat.

Other prior art relates to child seats, for instance, Japanese Patent application Laid-Open Publication (Kokai) No. 6-16072 which discloses a child seat having a shoulder supporting seat belt, the seat cushion of which can be pivoted frontward from the lower end portion of the seat back. Japanese Patent Application Laid-Open Publication (Kokai) No. 58-97531 discloses a child seat having a child headrest, in which the child headrest, that is lower than the height of the grown-up person's headrest, can be selectively mounted on the upper end portion of the seat back for improving the safety of the child seat.

In the case of the sedan-type car, since the rear seat back is fixedly supported by the vehicle body with rear bulkhead, the strength of the child seat assembled with the rear seat is relatively high. In the case of the wagon or light van the rear seat is divided into two or further, the two divided rear seats can be folded separately to increase the space of the luggage room at two stages. Since, no rear bulkhead is provided to support the rear seat back by the vehicle body, two locking members are provided on both upper outermost sides of the two divided rear seat backs, respectively, so as to be engaged with locking members provided at both the right and left side walls of the vehicle body whenever the rear seat back is stood up for use. In other words, each of the two divided rear seat backs is usually supported by the vehicle body at only three points in total: the two hinges provided, on right and left sides, under the lowermost portion of each of the two divided seat backs, and one above-mentioned locking member provided at the upper side surface of each of the two divided rear seat backs. As a result, there exists a problem in that the support strength is low when the child seat is assembled with the rear seat back in the case of vehicles such as wagons or light vans.

In more detail, when the rear seat back is divided into a wide and a narrow seat back at a ratio of 6:4 and further when the child seat is assembled with the vehicle-middle portion of the seat back of the wide seat back, the upper portion of the vehicle-middle portion of the rear seat back, that is, the seat back of the child seat is not supported directly on the vehicle body. In case of a collision, there then exists a problem in that the vehicle-middle portion of the seat back of the child seat is easily deformed in the front and rear direction of the vehicle.

SUMMARY OF THE INVENTION

It is the object of the present invention to provide a child seat assembled with the rear seat back of the vehicle such as a wagon or light van having two divided separately folding rear seats, in such a way as to satisfy the requirement as to the side wall area of the child seat.

Further, it is the other object of the present invention to provide a child headrest mounted on the rear seat back of the vehicle such as a wagon or light van having two divided separately folding rear seats, in such a way as to improve the strength of the child seat against a shock applied to the vehicle in a frontward and rearward direction.

To achieve the above-mentioned object, the first aspect of the present invention provides a vehicle rear seat with a child seat, a rear seat being divided into a first wide seat back and a second narrow seat back in such a way as to be folded up frontward, the vehicle rear seat comprising:

a seat back for the child seat defined in a recessed seat back portion formed at a vehicle-middle side of the first wide seat back;

a child seat cushion of the child seat pivotally mounted at a lower position of the recessed seat back portion in the first wide seat back;

a first projecting portion projected along an inner stepped portion of the recessed seat back portion in the first wide seat back in such a way as to define one side wall of the child seat; and a second projecting portion projected along a vehicle-middle side of said second narrow seat back in such a way as to define another side wall of the child seat, so that the child seat cushion is accommodated between the first and second projecting portions as well as in the recessed seat back portion, when not used.

Further, the second aspect of the present invention provides a vehicle rear seat with a child seat, a rear seat being divided into a first wide seat back and a second narrow seat back in such a way as to be folded up frontward, the vehicle rear seat comprising:

a seat back for the child seat defined in a recessed seat back portion formed at a vehicle-middle side of the first wide seat back;

a child seat cushion of the child seat pivotally mounted at a lower position of the recessed seat back portion in the first wide seat back;

a first projecting portion projected along an inner stepped portion of the recessed seat back portion in the first wide seat back in such a way as to define one side wall of the child seat; and a second projecting portion projected along an inner end side of the first wide seat back in such a way as to define another side wall of the child seat, so that the child seat cushion is accommodated between the first and second projecting portions as well as in the recessed seat back portion, when not used.

In the rear seat provided with the child seat according to the present invention, the wide side area can be formed on both sides of the child seat by the two projecting portions along both sides of the recessed seat back portion of the child seat formed at roughly the vehicle-middle portion of the rear seat in such a way that the child seat cushion can be accommodated in the recessed seat back portion when not used. It is possible to provide a child seat having two side wall areas each wide enough to satisfy the safety regulation, even in case of the vehicles such as wagons or light vans having a relatively thin back seat divided into two so as to be folded up frontward, separately, without changing the hip point of the rear passenger.

Further, the third aspect of the present invention provides a vehicle rear seat with a child seat, the rear seat being divided into a first wide seat back and a second narrow seat back in such a way as to be folded up frontward, the vehicle rear seat comprising:

a seat back for the child seat defined in a recessed seat back portion formed at a vehicle-middle side of the first wide seat back;

a child seat cushion of the child seat pivotally mounted at a lower position of the recessed seat back portion in the first wide seat back;

a child headrest for girding a child and arranged on the upper surface of the first wide seat back;

first and second straight stays fixed to the child headrest and inserted into two headrest insertion holes formed in the upper surface of the first wide seat back, respectively; and a third reverse-L shaped stay fixed to the second straight stay and inserted into a headrest insertion hole formed in an upper surface of the second narrow seat back, so as to fix the first wide seat back and the second narrow seat back with each other.

In the headrest of the child seat according to the present invention, whenever the child headrest is mounted on the upper surface of the rear seat, since the two divided rear seat backs not supported by the bulkhead can be fixed to each other by the child headrest having the two straight stays and one bent stay, it is possible to increase the strength of the child seat formed at the vehicle-middle portion of the rear seat. vehicle front and rear direction. Further, when the child seat is in use together with the child headrest, since the narrow seat back cannot be folded frontward, it is possible to always secure the sufficient wide side areas on both sides of the child seat.

DETAILED DESCRIPTION OF THE PREFERRED EMBODIMENTS

Preferred embodiments of the present invention will become understood from the following detailed description referring to the accompanying drawings.

Figure 1A:
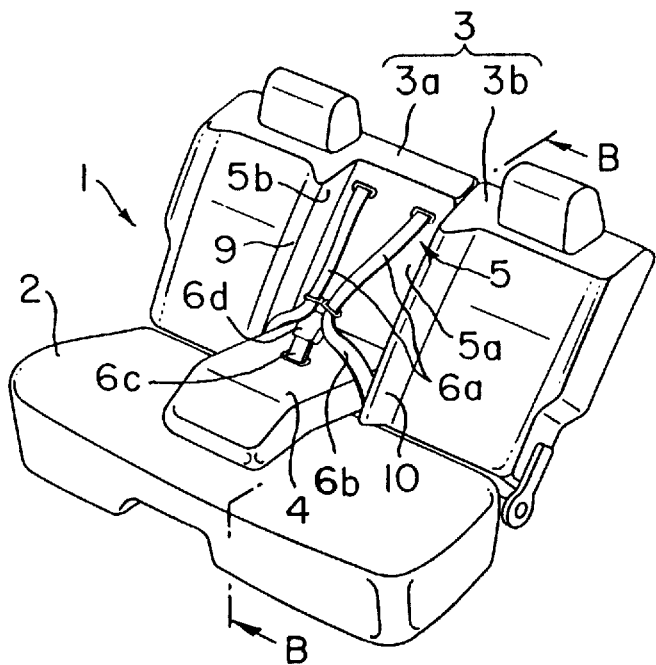
FIG. 1A is a perspective view showing a first embodiment of the vehicle rear seat provided with a child seat according to the present invention.
Figure 1B:
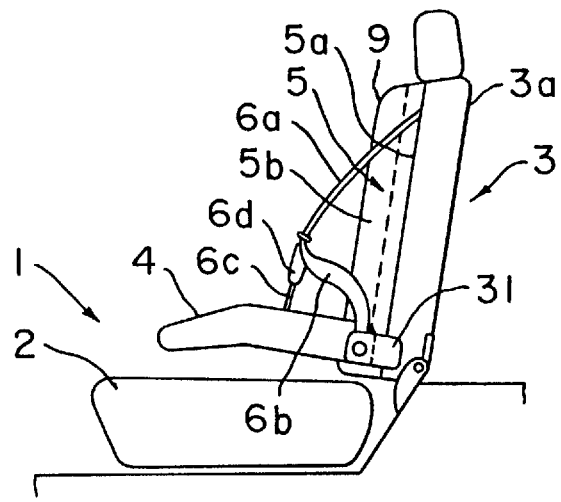
FIG. 1B is a side view showing the child seat in use when seen from the arrow direction B—B in FIG. 1A.
Figure 1C:
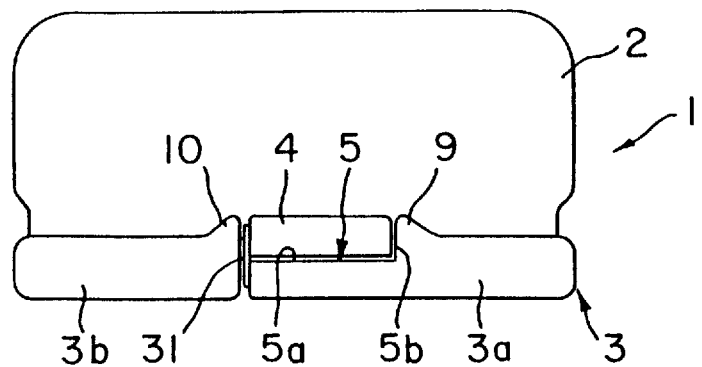
FIG. 1C is a top view showing the same rear seat shown in FIG. 1A, in which the child seat is accommodated in a rear seat back.

FIGS. 1A, 1B and 1C show a first embodiment of the rear seat provided with a child seat according to the present invention.

In FIG. 1A, a rear seat 1, mounted on the vehicle such as a wagon or light van, is composed of a seat cushion 2 and a seat back 3.

The seat back 3 is divided into a first wide seat back 3a and a second narrow seat back 3b at a ratio of about 6:4. Each of the two divided seat backs 3a and 3b is pivotally supported by a pivotal member fixed to the vehicle body at each front end portion of the luggage space in such a way as to be pivotal in the front and rear direction of the vehicle. Further, the two seat backs 3a and 3b are fixed to the vehicle body by locking members (not shown) provided at an outer end surface of the respective seat backs 3a and 3b whenever in upright position. On the other hand, when not used, the two seat backs 3a and 3b are pivoted frontward (counterclockwise in FIG. 1B) by releasing the locking members so as to be folded down, separately.

The first wide seat back 3a is formed with a recessed seat back portion 5 of a child seat. The recessed seat back portion 5 is composed of a bottom surface portion 5a and an inner stepped portion 5b to accommodate a child seat cushion 4 at roughly a vehicle-middle portion of the seat back 3 when the child seat is not used. A rear end portion of the child seat cushion 4 of the child seat is pivotally attached to the lower end portion of the recessed seat back portion 5 of the first wide seat back 3a. Therefore, when stood up for non-use, the child seat cushion 4 can be accommodated in the recessed seat back portion 5 of the first wide seat back 3a, and when brought down for use, the child seat cushion 4 can be projected frontward from the first wide seat back 3a. Further, in FIG. 1B, only one 31 of a pair of single mounting brackets for pivotally supporting the child seat cushion 4 of the child seat is shown on the lower side surface of the first wide seat back 3a. The other bracket (not shown) is provided on the inside of the first wide seat back 3a.

As understood in FIG. 1A, the bottom surface portion 5a of the recessed seat back portion 5 of the first wide seat back 3a serves as a seat back of the child seat when in use. Further, two child seat belts are provided at the bottom surface portion 5a so as to be extended when pulled out. The two child seat belts can gird a child put on the child seat cushion 4 of the child seat by putting two upper belt portions 6a on the two child shoulders and two lower belt portions 6b around the child waist. The base end portions of the two waist belts 6b are fixed to near the two mounting brackets 31 on both sides of the child seat cushion 4 of the child seat, and two tongues are attached at the middle portion of each of the two child seat belts 6a and 6b to separate each belt into the shoulder belt 6a and the waist belt 6b, respectively. Therefore, when the two tongues are engaged with a buckle 6d fixed to an top end of a crotch belt 6c, the child can be protected by the seat belts 6a, 6b and 6c in case of collision.

As already explained, the thickness of the child seat must be thick enough to satisfy the regulated side wall area requirement. However, since the seat back 3 of the wagon or light van is not so thick as a seat back in the case of the sedan-type car, it is impossible to form the recessed seat back portion 5 thick enough to satisfy this requirement. To overcome this problem, in the present invention, two frontward projecting first and second projecting portions 9 and 10 are formed on both sides of the recessed seat back portion 5, that is, in the first and second seat backs 3a and 3b, separately. In more detail, the first side wall portion of the child seat is formed by the first projecting portion 9 of the first wide seat back 3a along the inner stepped portion 5b of the recessed seat back portion 5 formed in the first wide seat back 3a; and the second side wall portion of the child seat is formed by a second projecting portion 10 of the second narrow seat back 3b along the inner end surface of the second narrow seat back 3b, in such a way as to form a wide recessed side wall on both sides of the child seat, respectively. As a result, it is possible to clear the side wall area requirement for the child seat even in the case of the relatively thin seat back of the wagon or the light van.

As described above, in the present invention, since the child seat having two wide side walls is formed by projecting both the outer end portions of the recessed seat back portion 5 of the first and second seat backs 3a and 3b in the frontward direction, the first and second projecting portions 9 and 10 will not adversely affect the riding comfort of two passengers in the rear seat on both sides of the child seat. In addition, since the hip point of the rear seat passenger is the same as when the child seat cushion 4 is not assembled with the rear seat 3, it is unnecessary to perform additional shock tests or shock test evaluations.

Figure 2A:
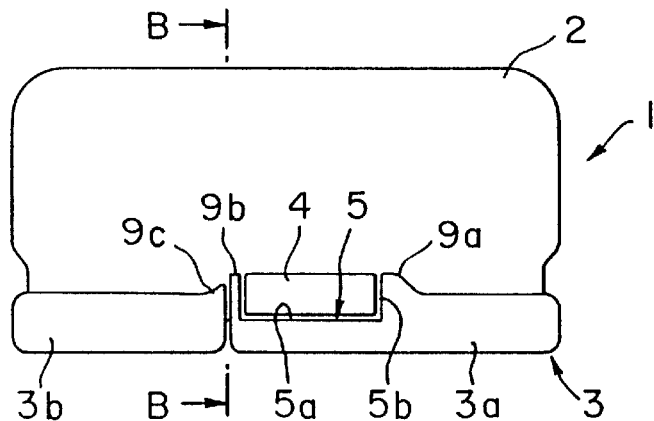
FIG. 2A is a top view showing a second embodiment of the vehicle rear seat provided with a child seat according to the present invention, in which the child seat is accommodated in a rear seat back.
Figure 2B:
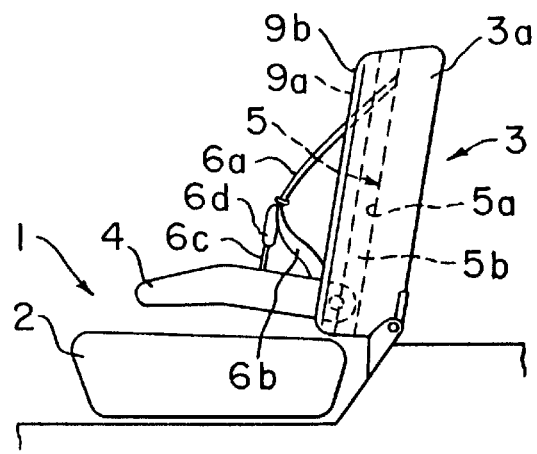
FIG. 2B is a side view showing the same child seat in use when seen from the arrow direction B—B in FIG. 1B.
Figure 2C:
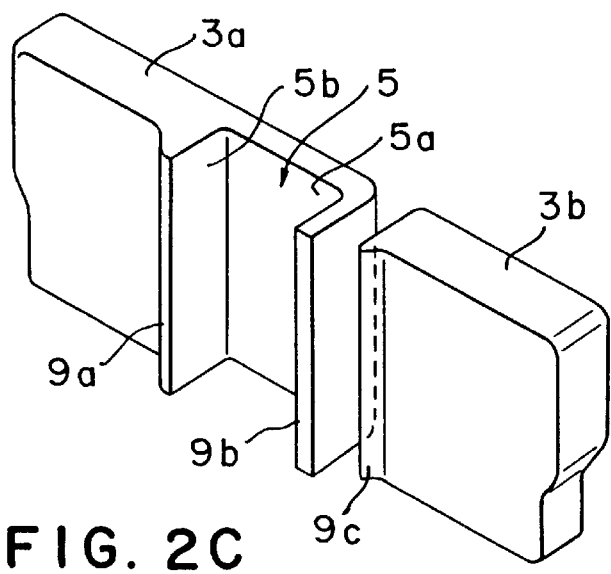
FIG. 2C is an enlarged exploded view showing the same seat back shown in FIG. 2B.

FIGS. 2A, 2B and 2C show a second embodiment of the rear seat provided with the child seat according to the present invention. This second embodiment is different from the first embodiment in that the recessed seat back portion 5 is formed in only the first wide seat back 3a. In other words, a first and second projecting portions 9a and 9b are formed on both sides of the recessed seat back portion 5, that is, in only the first wide seat back 3a. In more detail, the first side wall portion of the child seat is formed by the first projecting portion 9a of the first wide seat back 3a along the inner stepped portion 5b of the recessed seat back portion 5 formed in the first wide seat back 3a; and the second side wall portion of the child seat is formed by the second projecting portion 9b of the first wide seat back 3a along an inner end surface of the first wide seat back 3a, in such a way as to form a wide recessed side wall on both sides of the child seat, respectively. As a result, it is possible to clear the side wall area requirement for the child seat even in the case of the relatively thin seat back of the wagon or the light van.

Further, the second narrow seat back 3b is formed with a sloped portion 9c at the inner end surface thereof so as to form the first and second projecting portions 9a and 9b in symmetry with respect to shape. In addition, the two child seat mounting brackets for pivotally mounting the child seat cushion 4 are buried inside the first and second projecting portions 9a and 9b of the first wide seat back 3a, respectively.

Since the construction other than the above is basically the same as that of the first embodiment shown in FIGS. 1A to 1C, the same reference numerals have been retained for the similar parts or elements which have the same functions as with the case of the first embodiment, without repeating the similar description.

Further, in the case of the first embodiment, when only the second narrow seat back 3b is folded in the frontward direction, the second side wall of the child seat is lost. In this second embodiment, however, even when the second narrow seat back 3b is folded in the frontward direction, the child seat having the wide side walls can be kept unchanged. It is possible to maintain the safety of the child seat, even if the second narrow seat back 3b is folded.

In the second embodiment, since the child seat having two wide side walls can be formed by the two projecting portions 9a and 9b, i.e., projecting both the end portions of the recessed seat back portion 5 of the first wide seat backs 3a in the frontward direction, these first and second projecting portions 9a and 9b will not affect the riding comfort of two passengers in the rear seat on both sides of the child seat. In addition, since the hip point of the rear seat passenger is the same as when the child seat cushion 4 is not assembled with the rear seat 1, it is unnecessary to perform additional shock tests or shock test evaluations.

Further, in the above-mentioned embodiments, the seat cushion 2 is formed integral with both the first and second sides and only the seat back 3 is divided into two first and second seat backs 3a and 3b at a ratio of about 6:4 in such a way that each seat back can be folded up separately. Without being limited only thereto, it is possible to apply the rear seat provided with the child seat according to the present invention to a rear seat of another type such that the seat cushion and the seat back are both divided into the first and second sides, respectively at a ratio of about 6:4 and further the divided two rear seat cushions can be pivoted frontward and the divided two rear seat backs can be also folded down frontward.

In the rear seat provided with the child seat according to the present invention, the wide side area can be formed on both sides of the child seat by projecting two portions along both the sides of the recessed seat back portion of the child seat formed at roughly the vehicle-middle portion of the rear seat. In this way the child seat cushion can be accommodated in the recessed seat back portion when not used. It is thus possible to provide a child seat having two side wall areas each wide enough to satisfy the safety regulation, even in the case of the vehicle such as a wagon or a light van having a relatively thin back seat divided into two so as to be folded down frontward, separately, without changing the hip point of the rear passenger.

FIGS. 3A, 3B and 3C and FIGS. 4 and 5 show a third embodiment of the child seat according to the present invention. This third embodiment is different from the first embodiment in that a headrest 14 for a child seat is additionally provided for the seat back 3 by use of three stays in such a way that the two divided seat backs 3a and 3b can be fixed to each other.

Since the construction other than the above is basically the same as that of the first embodiment shown in FIGS. 1A to 1C, the same reference numerals have been retained for the similar parts or elements which have the same functions as with the case of the first embodiment, without repeating the similar description, except the portions different from the first embodiment.

In this third embodiment, the seat cushion 2 is also divided into a first wide seat cushion 2a and a second narrow seat cushion 2b at a ratio of about 6:4. Each of the two divided seat cushions 2a and 2b is pivotally supported by a pivotal member fixed to the vehicle body at each front side thereof so as to be pivotal in the front and rear direction of the vehicle, in the same way as with the case of the two seat backs 3a and 3b. Further, a locking member 7 is provided on each outer side surface of the seat back 3a or 3b near the upper surface thereof, respectively. Therefore, when the two seat backs 3a and 3b are upright, the locking member 7 can be locked by another locking member (not shown) fixed to the vehicle body, respectively. Further, under these conditions, however, when each lock knob 8 is pulled upward to release the locking member 7, it is possible to fold the rear seat back 3a or 3b in the frontward direction, separately, to increase the space of the luggage room in the wagon or light van.

Figure 3A:
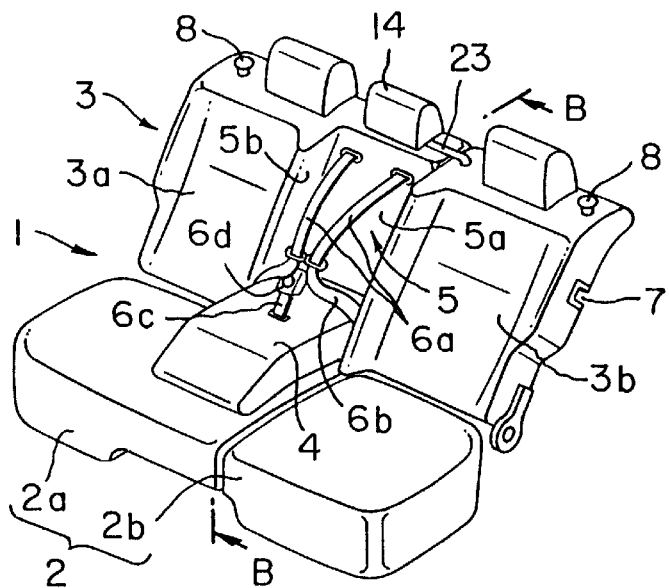
FIG. 3A is a perspective view showing a third embodiment of the vehicle rear seat provided with a child seat according to the present invention.
Figure 3B:
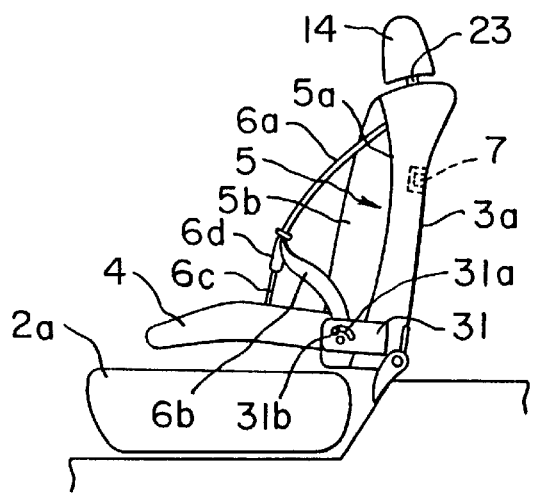
FIG. 3B is a side view showing the child seat in use when seen from the arrow direction B—B in FIG. 3A.
Figure 3C:
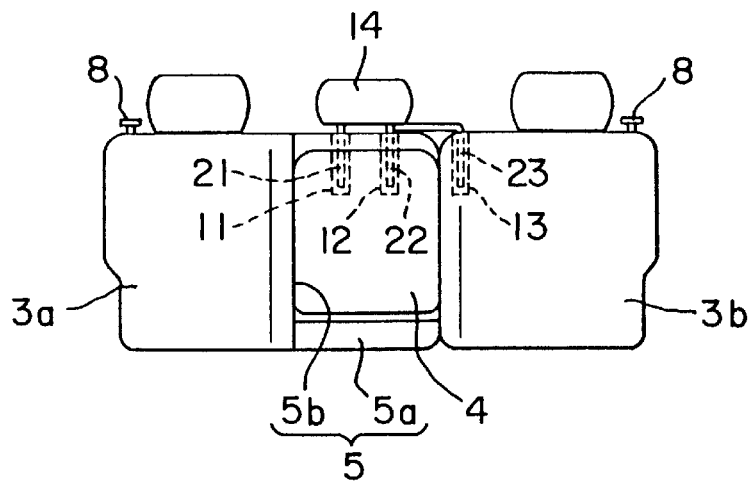
FIG. 3C is a front view showing the same rear seat shown in FIG. 3A, in which the child seat is accommodated in a rear seat back.
Figure 4:
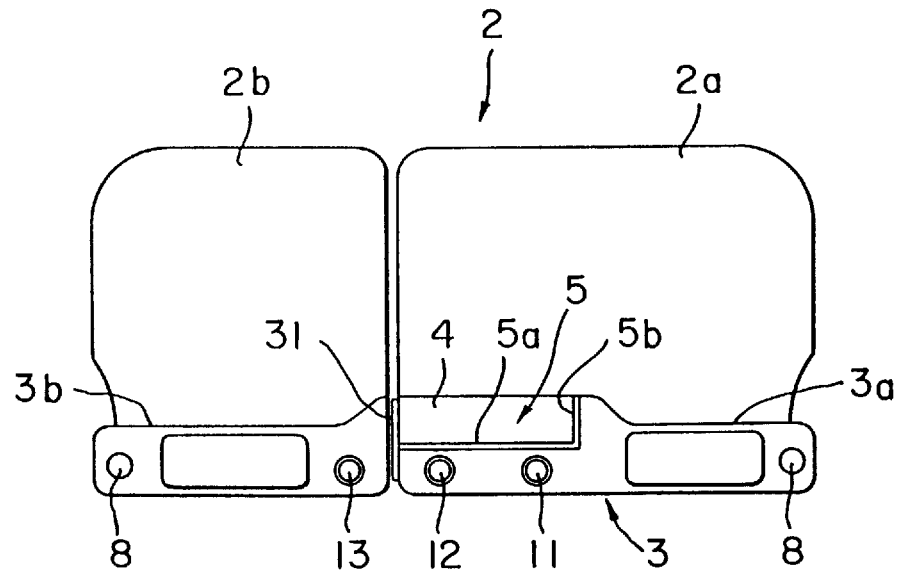
FIG. 4 is a top view showing the same rear seat shown in FIG. 3A, in which the child seat is accommodated in the rear seat back the headrest for the child seat is removed.

Further, as shown in FIG. 3B, the bracket 31 is attached to each of both the side surfaces of the child seat cushion 4 of the child seat. Each bracket 31 is formed with a curved groove 31a to and along which a rod member 31b projecting from the side surface of the child seat cushion 4 of the child seat is fitted and guided to restrict the frontward (use) position and the rearward (non-use) position of the child seat cushion 4 of the child seat.

Figure 5:
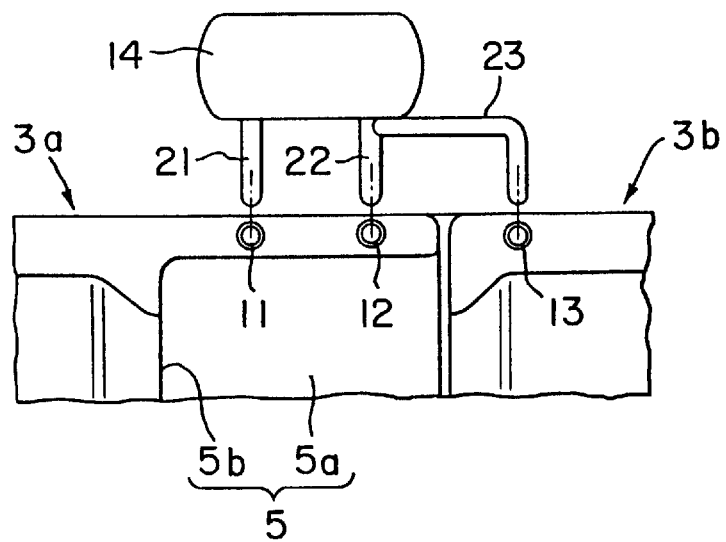
FIG. 5 is a perspective view showing the same rear seat shown in FIG. 3A, for assistance in explaining the positional relationship between the headrest for the child seat and the headrest insertion holes formed in the rear seat back.

The headrest 14 of the child seat is mounted on the upper end surface of the first wide seat back 3a just over the recessed seat back portion 5. As depicted in FIG. 5, two right and left headrest insertion holes 11 and 12 are formed on the upper end portion of the first wide seat back 3a at an interval narrower than the width of the bottom portion 5a of the recessed seat back portion 5. In addition, another headrest insertion hole 13 is formed on the upper end portion of the second narrow seat back 3b and on the side near the vehicle-middle portion.

On the other hand, the child headrest 14 is provided with two straight stays 21 and 22 and a single bent stay 23. Each diameter of stays 21, 22 and 23 is set a value close to the diameter of each hole 11, 12 and 13, respectively. The two straight stays 21 and 22 are inserted into and fixed to the two headrest insertion holes 11 and 12 formed on the upper surface of the first wide seat back 3a. The bent stay 23 fixed to and extending from the second stay 22 is inserted into and fixed to the headrest insertion hole 13 formed on the upper surface of the second narrow seat back 3b.

The bent stay 23 is formed of reverse-L-shape in such a way as to extend horizontally over the inner end surface of the first wide seat back 3a from the base portion of the straight stay 22 and then bent 90 degrees in the downward direction in parallel to the other two straight stays 21 and 22, so that the bent stay 23 can cross over the upper end surface of the junction portion between the first wide seat back 3a and the second narrow seat back 3b.

Although not shown in detail, the first, second and third headrest insertion hole 11, 12 or 13 is a cylindrical guide frame fixed to a reinforcement frame of the seat back, in the same way as with the case of the headrest insertion hole for the well-known grown-up person's headrest stay. Therefore, the whole load applied to the headrest can be received by the reinforcement frame of the seat back.

Therefore, when the child headrest 14 is mounted on the rear back seat 3, since the two straight stays 21 and 22 are inserted into and fixed to the two headrest insertion holes 11 and 12 of the first wide seat back 3a and the bent stay 23 is inserted into and fixed to the headrest insertion hole 13 of the second narrow seat back 3b, it is possible to connect the first wide seat back 3a and the second narrow seat back 3b by use of the three stays of the child headrest 14 strongly. The result is a that the strength of the upper portion of the seat back 3 can be increased back 3a and the second narrow seat back 3b. Therefore, in case of collision, it is possible to suppress the deformation of the child seat in the frontward direction as little as possible.

In addition, when the child seat cushion 4 of the child seat is being used, since the child headrest 14 is also mounted, the first wide seat back 3a and second narrow seat back 3b can be fixed to each other, so that the second narrow seat back 3b cannot be folded down in the frontward direction. In other words, the wide side surface area can be secured for safety of the child taking the child seat, when the child seat cushion 4 is in use.

Further, in the third embodiment, although the seat cushion 2 of the rear seat is divided in two, it is of course possible to apply the third embodiment when the seat cushion 2 is not divided into two, as with the case shown in FIG. 1A.

As described above, in the headrest of the child seat according to the present invention, whenever the child headrest is mounted on the upper surface of the rear seat, since the two divided rear seat backs not supported by the bulkhead can be fixed to each other by the child headrest having the two straight stays and one bent stay, it is possible to increase the strength of the child seat formed at the vehicle-middle portion of the rear seat. the vehicle front and rear direction. Further, when the child seat is in use together with the child headrest, since the narrow seat back cannot be folded frontward, it is possible to always secure the sufficient wide side areas on both sides of the child seat.

While the presently preferred embodiments of the present invention has been shown and described, it is to be understood that this disclosure is for the purpose of illustration and that various changes and modification may be made without departing from the scope of the invention as set forth in the appended claims.

What is claimed is:

1. A vehicle rear seat with a child seat having a rear seat back being divided side by side into a first seat back and a second seat back which are able to be folded down frontward independently, the vehicle rear seat comprising:

a recessed portion provided along a front surface of the first seat back at an end adjacent the second seat back to define a seat back for the child seat;

a first projecting portion provided on the first seat back and having a first slope substantially perpendicular along the recessed portion and a second slope angled to said first slope at a side remote from said recessed portion;

a second projecting portion provided along an end of the second seat back on an opposite side of the recessed portion from the first projecting portion and having a third slope substantially perpendicular along the recessed portion and a fourth slope angled to said third slope at a side remote from said recessed portion; and a child seat cushion pivotally mounted at a lower position of the recessed portion to be foldable toward the seat back so that the child seat cushion is accommodated between the first and second projecting portions as well as in the recessed portion, when not used, said child seat cushion, when accommodated in the recessed portion, having an outer surface that is substantially coplanar with the first and second projecting portions whereby only the child seat cushion and the first projecting portion and the second projecting portion project forward from the rear seat back and the thickness of the remainder of the rear seat back is reduced while when said child seat cushion is pivoted frontward for sitting, a child sitting on the child seat cushion is supported from the sides by said first and second projecting portions.

2. A vehicle rear seat with a child seat according to claim 1, wherein the first and second projecting portions are formed in symmetry with each other.

3. A vehicle rear seat with a child seat according to claim 1, further comprising a seat belt for girding a child put on the seat cushion and having an upper belt portion for putting on the child's shoulder and a lower belt portion for putting on a child's waist.

4. A vehicle rear seat with a child seat according to claim 1, further comprising a pair of mounting brackets connected to the first seat back to provide a pivot point for said child seat cushion.

* * * * *